(12) United States Patent
Koehne

(10) Patent No.: US 11,296,568 B2
(45) Date of Patent: Apr. 5, 2022

(54) COMPONENT OF AN ELECTRIC MACHINE

(71) Applicant: Robert Bosch GmbH, Stuttgart (DE)

(72) Inventor: Martin Koehne, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 315 days.

(21) Appl. No.: 16/489,450

(22) PCT Filed: Jan. 22, 2018

(86) PCT No.: PCT/EP2018/051456
§ 371 (c)(1),
(2) Date: Aug. 28, 2019

(87) PCT Pub. No.: WO2018/158003
PCT Pub. Date: Sep. 7, 2018

(65) Prior Publication Data
US 2020/0044504 A1 Feb. 6, 2020

(30) Foreign Application Priority Data

Mar. 1, 2017 (DE) ...................... 10 2017 203 296.0

(51) Int. Cl.
*H02K 3/22* (2006.01)
*H02K 3/02* (2006.01)

(52) U.S. Cl.
CPC ................. *H02K 3/22* (2013.01); *H02K 3/02* (2013.01)

(58) Field of Classification Search
CPC .......... H02K 3/22; H02K 3/02; H02K 15/066; H02K 3/52; H02K 2203/15
See application file for complete search history.

(56) References Cited

U.S. PATENT DOCUMENTS

| 5,484,983 A * | 1/1996 | Roell ....................... D04B 1/12 |
| | | 219/528 |
| 2004/0020681 A1* | 2/2004 | Hjortstam .............. H01B 9/006 |
| | | 174/102 SC |

(Continued)

FOREIGN PATENT DOCUMENTS

| CN | 1250967 A | 4/2000 |
| CN | 1381060 A | 11/2002 |

(Continued)

OTHER PUBLICATIONS

International Search Report for Application No. PCT/EP2018/051456 dated Apr. 25, 2018 (English Translation, 3 pages).

*Primary Examiner* — Naishadh N Desai
(74) *Attorney, Agent, or Firm* — Michael Best & Friedrich LLP

(57) ABSTRACT

Stators (2) having teeth (4) and electrical windings (5) provided on the teeth (4), wherein the electrical windings (5) comprise graphene and/or carbon nanotubes, are already known. The electrical winding (5) of the stator (2) is produced in a winding process. The electrical winding (5) in the component of an electric machine according to the invention can be produced more easily, in particular further electrical phases can be built into the electrical winding (5) in a simpler and reproducible manner. According to the invention, the electrical windings (5) are each formed as a tubular fabric which encloses the tooth (4) to which it is assigned.

21 Claims, 3 Drawing Sheets

(56) References Cited

U.S. PATENT DOCUMENTS

| | | | | |
|---|---|---|---|---|
| 2005/0218741 A1* | 10/2005 | Wnorowski, Jr. | ....... | H02K 3/02 |
| | | | | 310/179 |
| 2007/0033711 A1* | 2/2007 | Achtelstetter | ............ | D04B 1/26 |
| | | | | 2/239 |
| 2010/0164478 A1* | 7/2010 | Miura | .................... | H02N 1/004 |
| | | | | 324/109 |
| 2012/0256511 A1* | 10/2012 | Haruno | ................. | H02K 3/345 |
| | | | | 310/215 |
| 2015/0299522 A1* | 10/2015 | Lodde | ........................ | C09J 7/38 |
| | | | | 428/220 |
| 2017/0073861 A1* | 3/2017 | Herold-Herrmann | ........................ | |
| | | | | D04B 1/104 |

FOREIGN PATENT DOCUMENTS

| | | |
|---|---|---|
| CN | 203339832 U | 12/2013 |
| CN | 204156637 U | 2/2015 |
| DE | 102008025703 | 12/2009 |
| FR | 2293815 A1 | 7/1976 |
| JP | H09320349 A | 12/1997 |
| JP | 2008108583 | 5/2008 |
| JP | 2015079671 | 4/2015 |
| KR | 20140095667 A | 8/2014 |
| WO | 2015140047 | 9/2015 |

* cited by examiner

COMPONENT OF AN ELECTRIC MACHINE

BACKGROUND OF THE INVENTION

The invention takes as its starting-point a component of an electric machine, in particular a rotor or a stator.

A stator is already known from DE 10 2008 025 703 A1, with teeth and with electrical windings provided on the teeth, wherein the electrical windings include graphene and/or carbon nanotubes. The electrical winding of the stator is produced in a winding process.

SUMMARY OF THE INVENTION

The component, according to the invention, of an electric machine has, in contrast, the advantage that the electrical winding is easier to produce; in particular, further electrical phase conductors are capable of being incorporated into the electrical winding more easily and more reproducibly, in that the electrical windings each take the form of a tubular knit fabric that surrounds its assigned tooth. In the tubular knit fabric the yarn extends in the form of a helix with respect to its longitudinal extent, so that it is suitable as an electrical individual-tooth winding. The yarn of the knit fabric can be processed by conventional textile-technology methods for knit-fabric production to produce the tubular knit fabric.

By virtue of the measures listed in the subordinate claims, advantageous further developments and improvements of the component of an electric machine are possible.

It is particularly advantageous that the knit fabric includes graphene and/or carbon nanotubes, in particular with a minimum proportion amounting to 70%, since this material exhibits particularly good electrical and thermal conductivity and a very high tensile strength.

It is advantageous, moreover, if the knit fabric has been produced from a yarn or from a bundle of yarns, said yarn including graphene and/or carbon nanotubes, and said yarn or said bundle of yarns being surrounded by an electrical insulating layer. In this way, the cross-section of the electrical conductor required by the design of the machine can be realized.

It is very advantageous if the knit fabric has been pushed or slipped onto its assigned tooth in an elastically stretched state, since in this way the individual sections of the knit fabric are aligned in such a manner that no sections exist extending in the opposite sense to themselves that is to say, there are no loops. Furthermore, the individual electrical winding is set on the assigned tooth by the elastic elongation.

It is also advantageous if the tubular knit fabric has been provided on the assigned tooth pleated in several layers, the pleats having been aligned in the radial direction with respect to an axis of the component, or at right angles to the radial direction. In this way, a particularly high filling factor between the teeth of the component is obtained.

According to an advantageous version, the knit fabric is a jersey knit fabric or a double-jersey knit fabric or an interlock knit fabric.

Furthermore, it is advantageous if the tubular knit fabric comprises right-left (RL), right-right (RR) crossed or left-left (LL) stitch patterns. RL stitch patterns have the advantage that they enable a high stretchability and a low electrical loss. This low electrical loss arises, since in the stretched state the loopings of yarn, which conduct current in contrary directions, have been minimized.

It is advantageous if the RL stitch patterns exhibit a float stitch or a tuck stitch as pattern element. RL stitch patterns with the tuck-stitch pattern element bring about a particularly high stretchability of the tubular knit fabric.

In addition, it is advantageous if the RR stitch patterns exhibit a weft thread as pattern element, since in this way an unraveling of the stitches is prevented. Furthermore, the weft thread can also be utilized as a further electrical phase conductor.

BRIEF DESCRIPTION OF THE DRAWINGS

Embodiments of the invention are represented in simplified manner in the drawing and elucidated in more detail in the following description.

DETAILED DESCRIPTION

Figure 1:
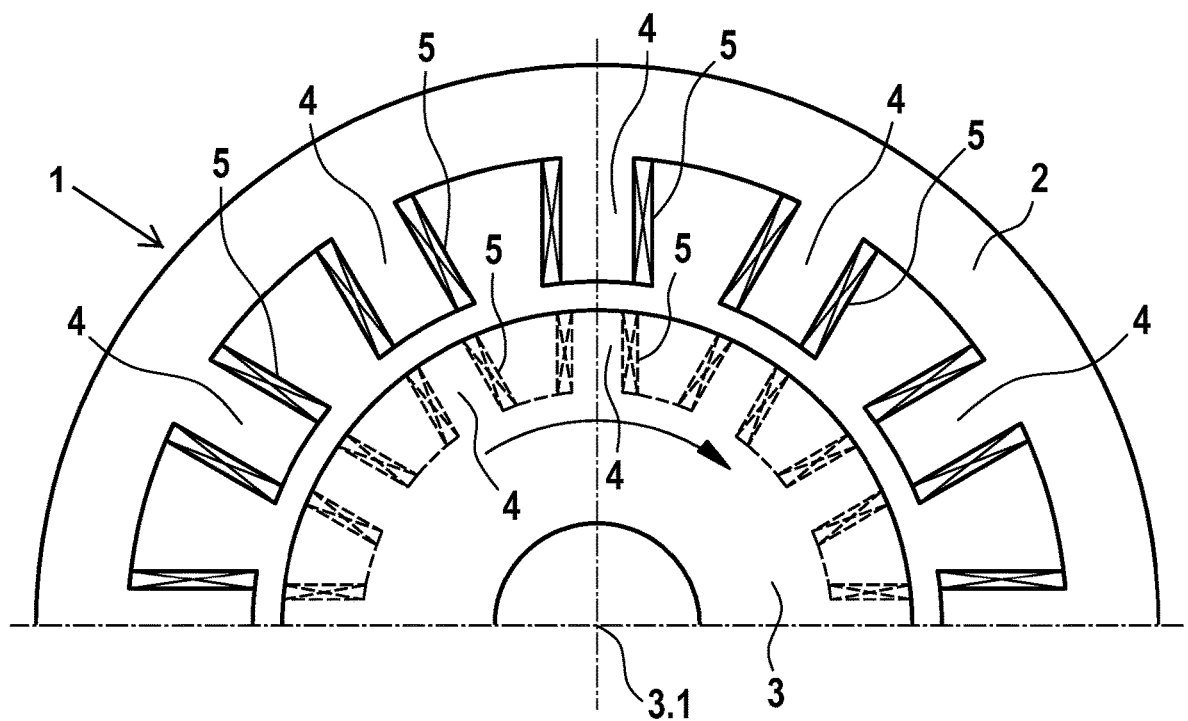
FIG. 1 shows a partial view of an electric machine in which the invention may find application, FIG. 2 a tooth of a stator or rotor according to FIG. 1 with an electrical winding according to the invention, according to a first embodiment, FIG. 3 a tooth of a stator or rotor according to FIG. 1 with an electrical winding according to the invention, according to a second embodiment, FIG. 4 a tooth of a stator or rotor according to FIG. 1 with an electrical winding according to the invention, according to a third embodiment and FIG. 5 a view of a possible practical form of the tubular knit fabric, according to the invention, of the electrical winding according to FIG. 1 to FIG. 4 in a linear developed view.

FIG. 1 shows a partial view of an electric machine in which the invention may find application.

The electric machine 1 includes as components a stator 2 and a rotor 3 which is supported so as to be capable of rotating about an axis 3.1. The stator 2 and/or the rotor 3 exhibit(s) teeth 4, on each of which an electrical winding 5 has been provided as individual-tooth winding. The electrical windings 5 include graphene and/or carbon nanotubes (CNT).

Figure 2:
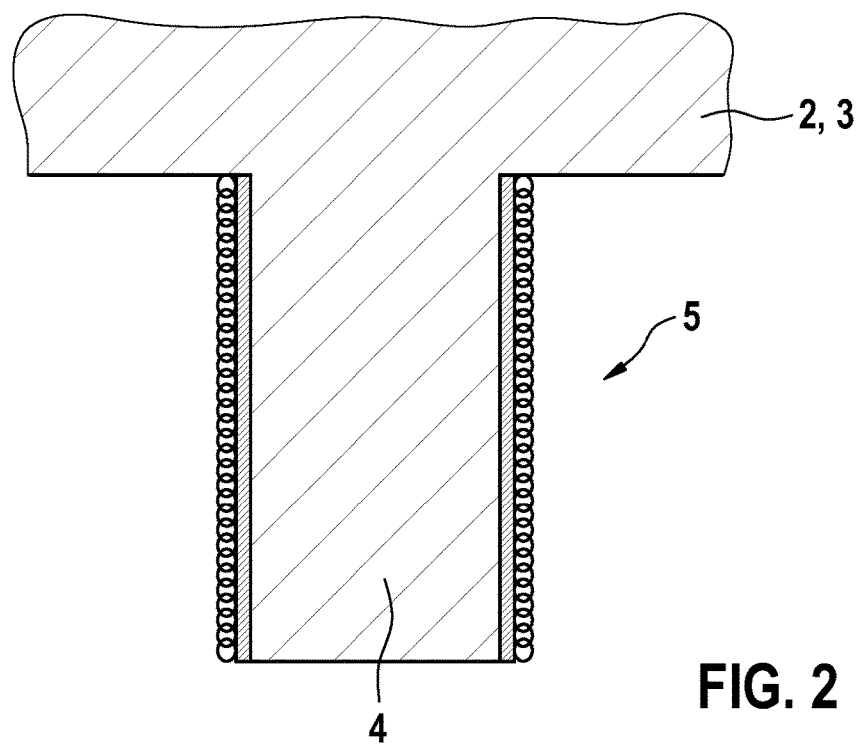

FIG. 2 shows a tooth of a stator 2 or of a rotor 3 according to FIG. 1 with an electrical winding according to the invention, according to a first embodiment.

The invention provides that the electrical windings 5 each take the form of a tubular knit fabric which surrounds its assigned tooth 4. The knit fabric according to the invention is a circular-knit fabric in which the yarn or the thread circulates in the form of a helix. The knit fabric is a very elastic knit fabric with high stretchability. The knit fabric includes graphene and/or carbon nanotubes (CNT), in particular with a minimum proportion amounting to 70%, 80% or 90%. The knit fabric has been produced by means of knitting technology from a yarn, a thread or a fiber or a bundle of one of these elements, said yarn, thread or fiber including the graphene and/or carbon nanotubes (CNT), in particular with a minimum proportion amounting to 70%, 80% or 90%, or having been produced therefrom. A composite formed from fibers for example a braided fabric formed from fibers is regarded as yarn.

The yarn, the thread or the fiber or the bundle of one of these elements is surrounded by an electrical insulating layer.

The knit fabric according to the invention is, for example, pushed onto its assigned tooth 4 in an elastically stretched state, so that by reason of the elastic preliminary tension said knit fabric has been set on its tooth 4.

According to the first embodiment, the tubular knit fabric has been provided in one layer on the assigned tooth 4.

Within the tubular knit fabric of the windings 5 several electrical phase conductors may have been integrated in each instance, by the yarn or thread thereof having been incorporated by knitting into the tubular knit fabric, electrically in parallel in each instance. Alternatively, the individual electrical phase conductors of the windings 5 may each take the form of a separate tubular knit fabric.

Figure 3:
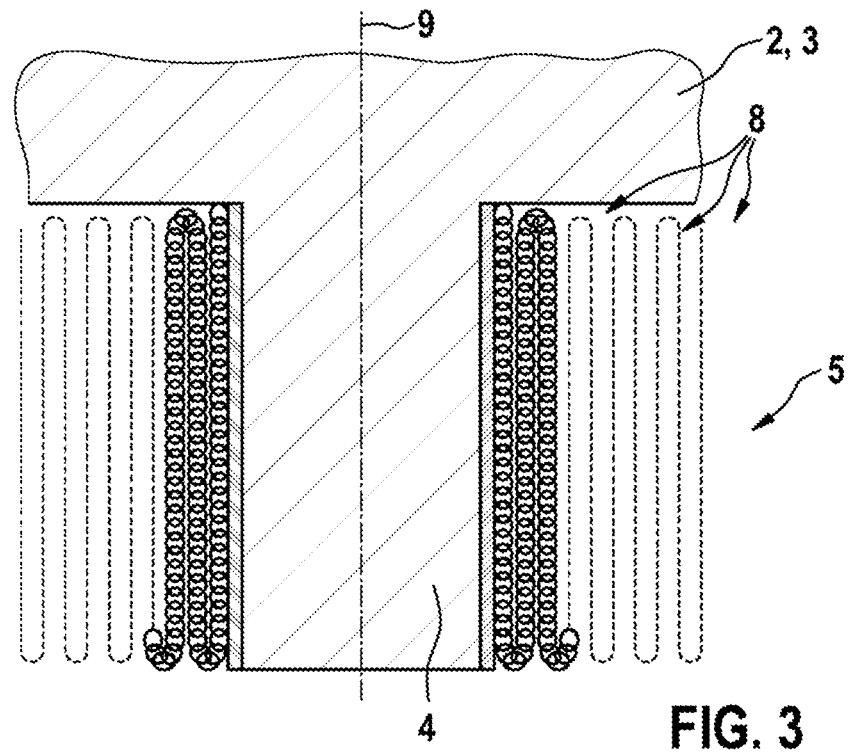

FIG. 3 shows a tooth of a stator 2 or rotor 3 according to FIG. 1 with an electrical winding according to the invention, according to a second embodiment.

The second embodiment differs from the first embodiment in that the tubular fabric has been arranged in several layers 8, pleated on the assigned tooth 4, instead of in a single layer. According to the second embodiment, the individual layers 8 of the tubular knit fabric have been aligned with their longitudinal extent in the radial direction 9 with respect to the axis 3.1. As a result, a meandering course of the tubular knit fabric arises at right angles to the radial direction 9. The electrical connections of the tubular knit fabric have, for example, been provided in each instance at the foot of the tooth 4.

Figure 4:
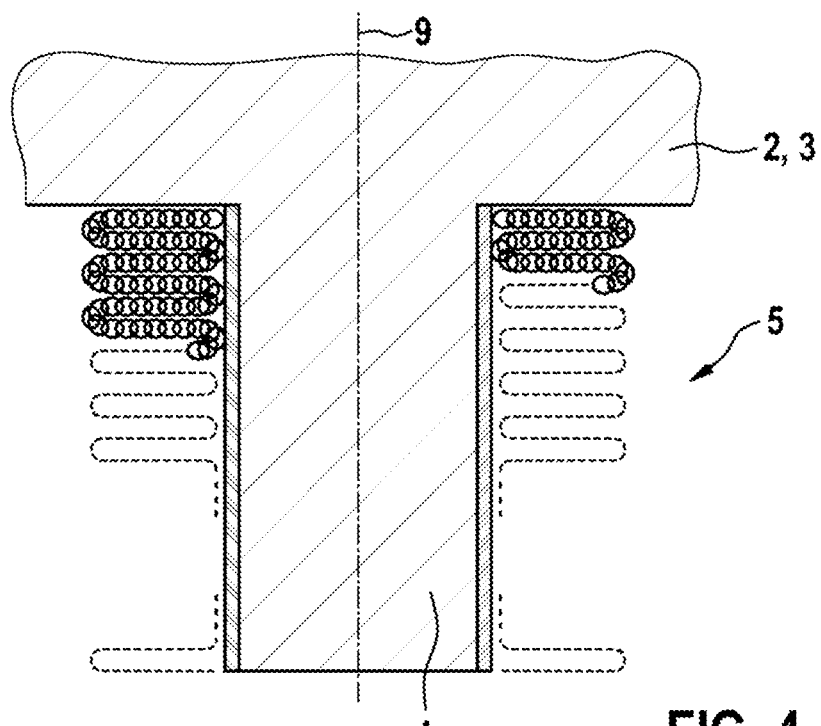

FIG. 4 shows a tooth of a stator 2 or rotor 3 according to FIG. 1 with an electrical winding according to the invention, according to a third embodiment. The third embodiment differs from the second embodiment in that the layers 8 of the tubular knit fabric have been aligned with their longitudinal extent at right angles to the radial direction 9 with respect to the axis 3.1. As a result, a concertina-shaped or bellows-shaped course arises. The arrangement of the individual layers 8 of the tubular knit fabric can be set by an appropriate setting, for example by a baked lacquer which sets the knit fabric after heating, by an adhesive bond by means of a resin, by a setting thread which has been passed repeatedly through the knit fabric, or by a cover which at least partially covers the knit fabric with preliminary tension and thereby sets it.

Figure 5:
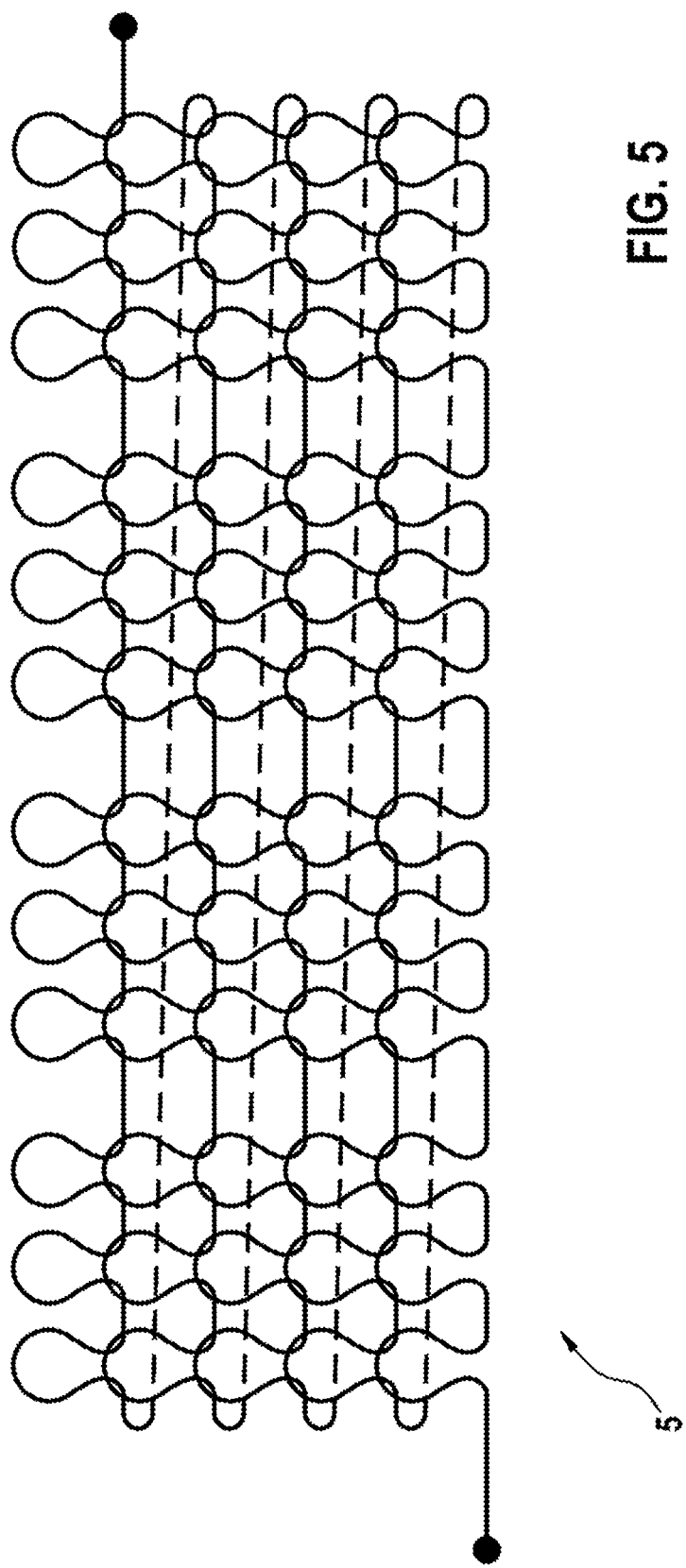

FIG. 5 shows a view of a possible practical form of the tubular knit fabric, according to the invention, of the electrical winding according to FIG. 1 to FIG. 4 in a linear developed view.

The tubular fabric according to the invention may comprise, as shown in FIG. 5, right-left (RL) stitch patterns, for example. Alternatively, right-right (RR) crossed or left-left (LL) stitch patterns may have been provided. Right-left stitch patterns result in a so-called jersey knit fabric, and right-right-crossed stitch patterns in a so-called double-jersey knit fabric or interlock knit fabric.

An unraveling of the stitches of the tubular knit fabric can be prevented by closing off, or by one or more weft threads.

In the case of RL stitch patterns, a float stitch or a tuck stitch may have been provided as pattern element, and weft threads may have been provided as pattern element in the case of RR stitch patterns.

What is claimed is:

1. A component (2,3) of an electric machine (1), with teeth (4) and with electrical windings (5) provided on the teeth (4), wherein the electrical windings (5) include graphene and/or carbon nanotubes, characterized in that the electrical windings (5) each take the form of a tubular knit fabric which surrounds a respective tooth (4),
    wherein the knit fabric is in an elastically stretched state,
    wherein the knit fabric is a jersey knit fabric or double-jersey knit fabric or interlock knit fabric, and
    wherein the tubular knit fabric comprises a right-left (RL), a right-right (RR) crossed or a left-left (LL) stitch pattern.

2. The component as claimed in claim 1, characterized in that the knit fabric has been produced from a yarn or from a bundle of yarns, said yarn including graphene and/or carbon nanotubes, and said yarn or said bundle of yarns being surrounded by an electrical insulating layer.

3. The component as claimed in claim 1, characterized in that the tubular knit fabric has been provided on the respective tooth (4) pleated in several layers (8), said layers (8) having been aligned in a radial direction (9) with respect to an axis (3.1) of the component (2,3), or at right angles to the radial direction (9).

4. The component as claimed in claim 1, characterized in that the RL stitch patterns exhibit a float stitch or a tuck stitch as pattern element.

5. The component as claimed in claim 1, characterized in that the RR stitch patterns exhibit a weft thread as pattern element.

6. The component as claimed in claim 1, characterized in that the knit fabric includes graphene and/or carbon nanotubes with a minimum proportion amounting to 70%.

7. The component as claimed in claim 1, characterized in that the knit fabric includes graphene and/or carbon nanotubes with a minimum proportion amounting to 80%.

8. The component as claimed in claim 1, characterized in that the knit fabric includes graphene and/or carbon nanotubes with a minimum proportion amounting to 90%.

9. The component as claimed in claim 1, wherein the component is a stator.

10. The component as claimed in claim 9, characterized in that the knit fabric has been produced from a yarn or from a bundle of yarns, said yarn including graphene and/or carbon nanotubes, and said yarn or said bundle of yarns being surrounded by an electrical insulating layer.

11. The component as claimed in claim 1, wherein the component is a rotor.

12. The component as claimed in claim 11, characterized in that the knit fabric has been produced from a yarn or from a bundle of yarns, said yarn including graphene and/or carbon nanotubes, and said yarn or said bundle of yarns being surrounded by an electrical insulating layer.

13. The component as claimed in claim 1, wherein the electrical windings (5) include graphene and carbon nanotubes.

14. The component as claimed in claim 1, wherein the electrical windings (5) include graphene.

15. The component as claimed in claim 1, wherein the electrical windings (5) include carbon nanotubes.

16. The component as claimed in claim 1, wherein the knit fabric is a jersey knit fabric.

17. The component as claimed in claim 1, wherein the knit fabric is a double-jersey knit fabric.

18. The component as claimed in claim 1, wherein the knit fabric is an interlock knit fabric.

19. The component as claimed in claim 1, wherein the tubular knit fabric comprises a right-left (RL) stitch pattern.

20. The component as claimed in claim 1, wherein the tubular knit fabric comprises a right-right (RR) crossed stitch pattern.

21. The component as claimed in claim 1, wherein the tubular knit fabric comprises a left-left (LL) stitch pattern.

* * * * *